(No Model.)
E. SCHANNEP.
FEED RACK.
No. 305,967. Patented Sept. 30, 1884.
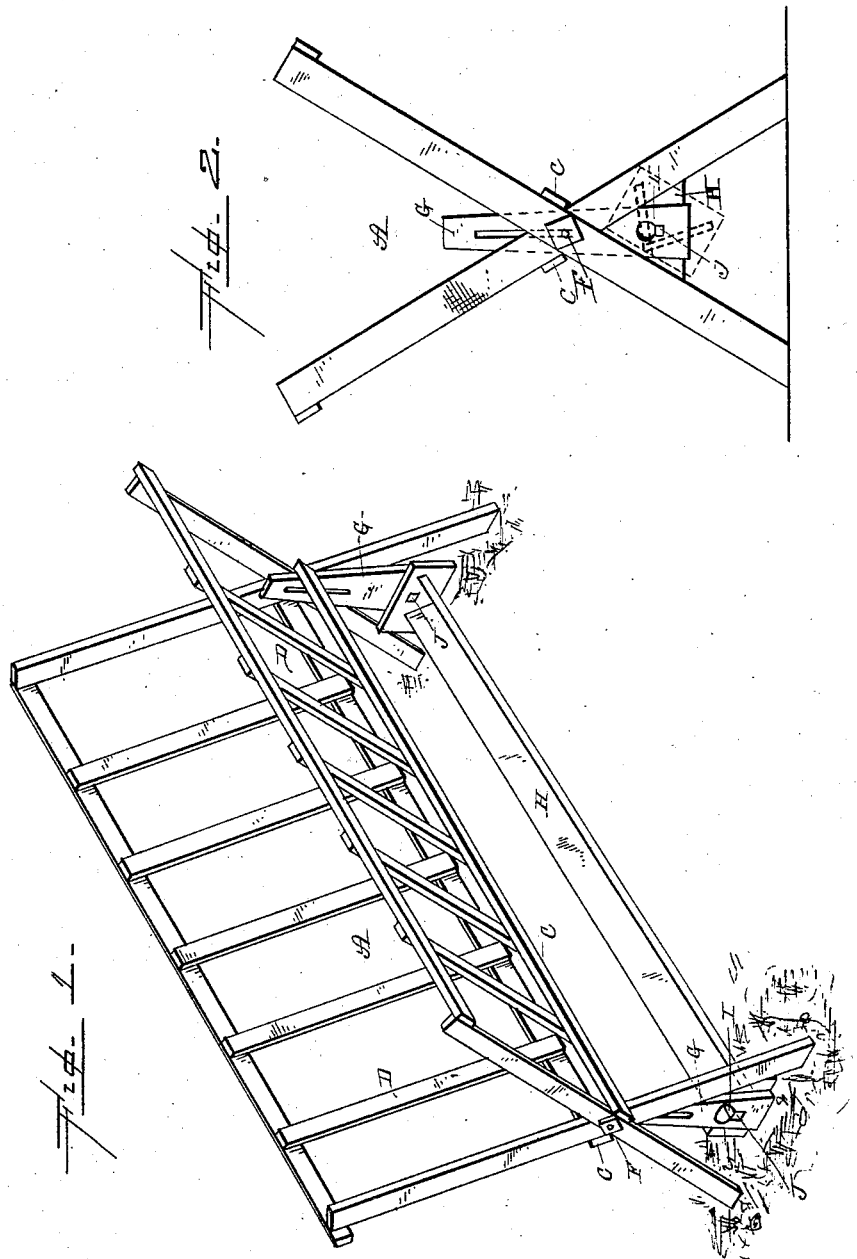

UNITED STATES PATENT OFFICE.

EDGAR SCHANNEP, OF COLLAMER, INDIANA.

FEED-RACK.

SPECIFICATION forming part of Letters Patent No. 305,967, dated September 30, 1884.

Application filed March 10, 1884. (No model.)

*To all whom it may concern:*

Be it known that I, E. SCHANNEP, of Collamer, in the county of Whitley and State of Indiana, have invented certain new and useful Improvements in Feed-Racks; and I do hereby declare the following to be a full, clear, and exact description of the invention, such as will enable others skilled in the art to which it pertains to make and use it, reference being had to the accompanying drawings, which form part of this specification.

My invention relates to an improvement in feed-racks; and it consists, first, in a rack formed of two pieces, which are pivoted together, each part being provided with horizontal bars which act as stops to limit the movement of the two parts in opening, and with the vertical strips which are secured thereto, substantially as shown; and, second, in the combination of the feed-rack, suitable hangers, and the trough, the hangers being provided with slots which are largest at their upper ends, and which are angular at their lower ends, whereby when the trough is raised upward it can be freely tilted, but when dropped downward it is held rigidly in position, all of which will be more fully described hereinafter.

The object of my invention is to provide a light and cheap portable feed-rack which can be closed up when no longer needed, and which is provided with a trough which can be tilted for the purpose of cleaning it out, the bearings of the trough being so formed that they lock the trough rigidly in position.

Figure 1 is a perspective of a rack embodying my invention complete. Fig. 2 is an end view of the same, showing the trough in one position in dotted lines and in another position in solid lines.

The feed-rack A consists of two parts which are pivoted together at their ends, and which can be closed up when no longer needed, or opened out when in use. The horizontal bars C form stops for the purpose of limiting the distance to which the rack shall be opened. The vertical strips D may be either secured to the inner or the outer sides of the horizontal strips, as may be preferred. Upon the bolts F, by which the parts A of the rack are clamped together, are suspended the two slotted hangers G, by means of which the feed-trough H is supported. These hangers are slotted at their upper ends, in order that the trough may be adjusted vertically to any desired height. After the hangers have been adjusted so as to raise the trough upward to any desired distance the bolts are tightened, so as to hold the hangers rigidly in place. In the lower ends of these hangers are made the slots I, which are made angular at their lower ends, and suitably enlarged at their upper ends. The journals J of the trough are made square, so that when the journals are in the lower angular portions of the slot the trough cannot revolve or turn in the slightest. When, however, the trough is raised upward, so that its journals come in the enlarged ends of the slots, the trough can be freely turned for the purpose of emptying it out; or, if it is desired to prevent the trough from becoming filled with dirt, the trough can be raised upward and then turned entirely over, and the journals allowed to again sink down into the angular portions of the slots, when the trough will be locked in an inverted position. By providing the trough with angular journals and supported in slots which are angular, as shown, the trough can be locked in place, so that it cannot be upset by animals putting their feet in or upon it. The trough may either be made V-shaped or rectangular, as may be preferred. The rack and the trough will of course be made of a height and length proportioned to the kind of animals which are to eat out of it. If made for sheep, it will of course be made smaller than for larger animals, and I do not therefore limit myself in any respect to the size or the proportion of the parts used.

Having thus described my invention, I claim—

1. A rack formed of two pieces which are pivoted together, each part being provided with horizontal bars which act as stops to limit the movement of the two parts A in opening, and with the vertical strips, which are secured thereto, substantially as shown.

2. The combination, with a feed-rack, of the hangers G, having the openings I through their lower ends, with the trough H, provided with the bearings J, the parts being constructed and arranged to operate substantially as described.

In testimony whereof I affix my signature in presence of two witnesses.

EDGAR SCHANNEP.

Witnesses:
  W. S. RIEGLE,
  DAVE STRIGGLE.